United States Patent [19]

Bolgiano et al.

[11] Patent Number: 4,785,450
[45] Date of Patent: Nov. 15, 1988

[54] APPARATUS AND METHOD FOR OBTAINING FREQUENCY AGILITY IN DIGITAL COMMUNICATION SYSTEMS

[75] Inventors: Duane R. Bolgiano, Gladwyne; Chumlong Deangdeelert, Philadelphia, both of Pa.

[73] Assignee: International Mobile Machines Corporation, Philadelphia, Pa.

[21] Appl. No.: 82,238

[22] Filed: Aug. 6, 1987

[51] Int. Cl.$^4$ .......................... H04J 3/16; H04Q 7/00; H04B 7/00
[52] U.S. Cl. .......................... 370/95; 370/13; 455/34; 455/54; 379/59
[58] Field of Search ............... 370/95, 79, 13; 455/33, 455/34, 53, 54, 56; 379/59, 60

[56] References Cited

U.S. PATENT DOCUMENTS

| | | | |
|---|---|---|---|
| 4,215,244 | 7/1980 | Gutleber | 370/95 |
| 4,355,411 | 10/1982 | Reudink et al. | 455/56 |
| 4,398,063 | 8/1983 | Hass et al. | 455/33 |

Primary Examiner—Douglas W. Olms
Assistant Examiner—Wellington Chin
Attorney, Agent, or Firm—Arthur A. Jacobs

[57] ABSTRACT

In a communication system that comprises a plurality of subscriber stations in RF communication with a base station having multiple sequentially repetitive time slots, each time slot being assigned to a particular subscriber station, means to change either the frequency or the time slot configurations, or both, in the event of a deterioration of transmission quality caused by modulation change, frequency channel interference, equipment failure, or the like, or by the entrance of additional subscriber stations going on line.

8 Claims, 4 Drawing Sheets

| FREQ PAIR | SLOT PAIR | | | |
|---|---|---|---|---|
| | 1 | 2 | 3 | 4 |
| A | 1 | 1 | 1 | 1 |
| B | 1 | 0 | 1 | 0 |
| C | 1 | 1 | 0 | 1 |
| D | 1 | 1 | 1 | 1 |
| E | 1 | 1 | 1 | 0 |
| F | 0 | 1 | 0 | 1 |
| G | 0 | 0 | 1 | 1 |

APPARATUS AND METHOD FOR OBTAINING FREQUENCY AGILITY IN DIGITAL COMMUNICATION SYSTEMS

BACKGROUND OF THE INVENTION

The present invention relates to wireless digital telephone systems wherein a base station is in communication with a plurality of subscriber stations connected thereto by RF channels in a manner to permit simultaneous communications with the subscriber stations over a given channel having multiple sequentially repetitive time slots, with particular time slots being assigned to particular subscriber stations.

SUMMARY OF THE INVENTION

The present invention relates to a wireless digital telephone system that includes a base station in communication with a plurality of subscriber stations connected thereto by RF channels in a manner to permit simultaneous communication with the subscriber stations over a given channel having multiple sequentially repetitive time slots, with particular time slots being assigned to particular subscriber stations. The present invention provides means to automatically change either the frequency or the time slot configurations, or both, in the event of the entrance of additional subscriber units which have gone off-hook or in the event of deterioration of transmission quality due to modulation change, frequency channel interference, equipment failure, or the like. The change means includes a remote-connection processing unit and an exchange unit, preferably in the form of a concentrator, which includes a switch that responds to a control signal from the remote-connection processing unit by physically connecting a selected port in a communication circuit to a selected slot. The control signals are supplied in response to status messages received by the remote-connection processing unit.

This invention relates to communications systems of the wireless digital telephone type, and it more particularly relates to means in such a system for automatically adjusting the system to compensate for undesirable effects during operation such as frequency interferences, fading, link quality deterioration and equipment failure.

The present invention is utilizable in a system such as disclosed in U. S. patent application Ser. No. 713,925, filed Mar. 20, 1985 now issued as U.S. Pat. No. 4,675,863, dated June 23, 1987. Such a system comprises a base station and a plurality of subscriber stations connected thereto by RF channels. It provides for communication between the subscriber stations and an external communication network having a plurality of ports. The base station includes a communication circuit for enabling simultaneous communications between a plurality of the ports and the subscriber stations over a given communication channel having multiple sequentially repetitive time slots, with predetermined time slots being assigned respectively to predetermined subscriber stations. The system includes a central office terminal (COT) in which is provided a remote-connection radio processing unit (RPU) for directing communications between the time slot assigned to a given subscriber station and a given port and an exchange for connecting the communication circuit to the ports. The exchange, which is preferably a concentrator of a type hereinafter more fully described, includes a switch which responds to a control signal from the RPU by physically connecting a selected port to a selected communication channel time slot assigned to a given subscriber station.

The communication circuit includes a plurality of channel control units (CCUs) for coupling the assigned communication channel time slot to the corresponding subscriber station in response to a command signal communicated by the RPU to the CCU's over a baseband control channel (BCC). These command signals are in response to status messages provided over the BCC to the RPU to indicate the usage status of the communication channel time slots and the subscriber stations. The assigned communication channel time slot is coupled to the corresponding subscriber station by an assigned time slot in an assigned radio frequency (RF) channel. The BCC is provided over lines separately connected from the RPU to each of the CCU's. Control commands and status messages are communicated between the CCUs and the subscriber stations over a radio control channel (RCC) assigned to a predetermined time slot of a predetermined RF channel.

The primary object of the present invention is to provide frequency and slot agility to overcome any difficulties in transmissions between the base station and its associated subscriber units. Another object of the present invention is to provide the aforesaid agility in a relativley simple and inexpensive manner.

The various other objects and attendant advantages of the present invention will be readily apparent from the following detailed description when read in conjunction with the following drawings wherein.

GLOSSARY OF ACRONYMS

Figure 1:
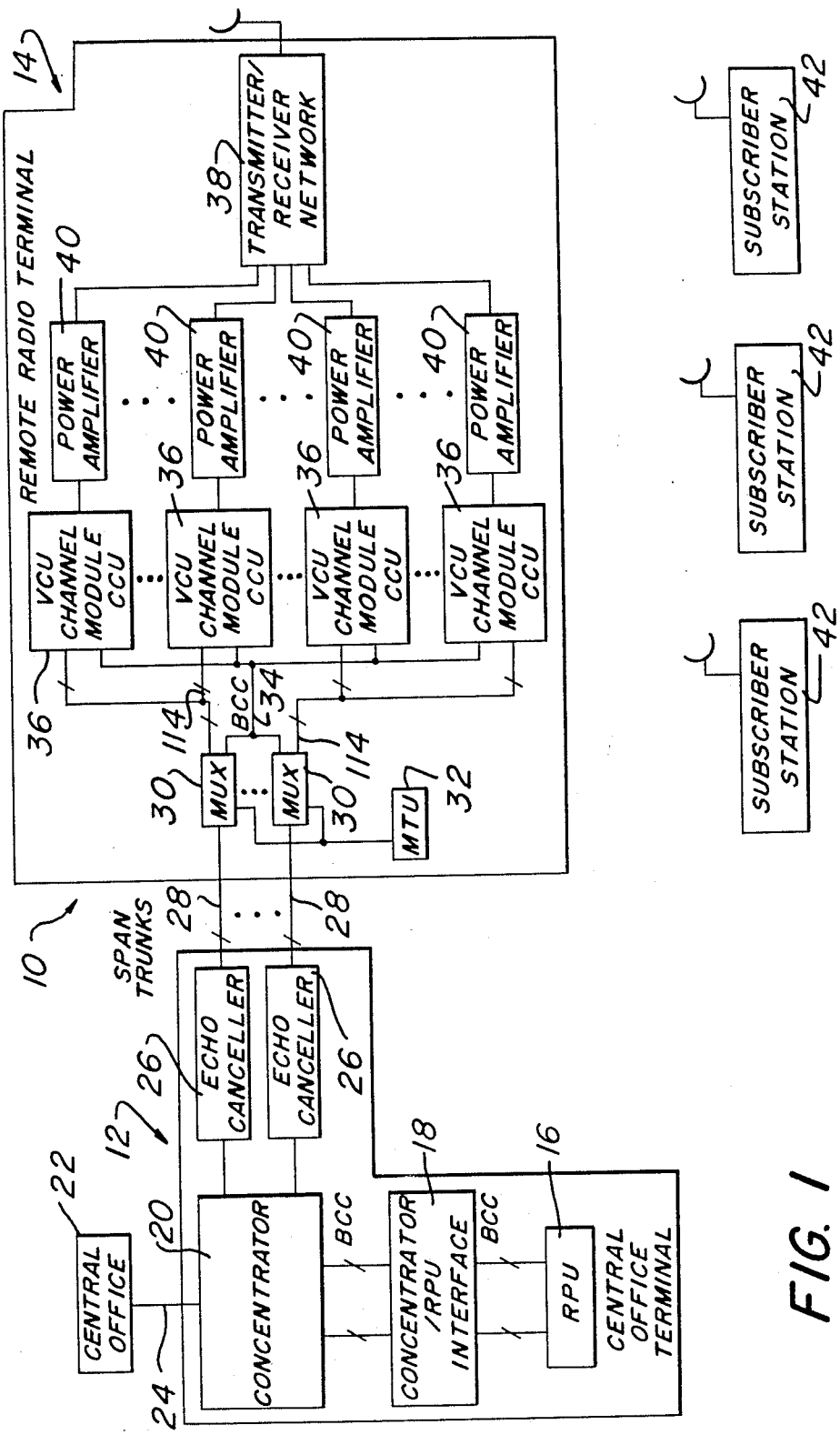
FIG. 1 is a block diagram of a base station utilized in the present invention, the connected subscriber stations being generally indicated.

BCC: baseband control channel
BER: bit error rate
CCT: channel control task
CCU: channel control unit
CO: central office
COT: central office terminal
CRC: cyclic redundancy check
DBM: data base module
LQ: link quality
MF: malfunction
MPM: message processing module
MTU: master timing unit MUX: multiplexer
PCM: pulse code modulation
RCC: radio control channel
RF: radio frequency
RPU: radio processing unit
RRT: remote radio terminal
SCT: subscriber control task
SDLC: synchronous data link control
SM: scheduler module
VCU: voice codec unit Referring to the drawings wherein similar reference characters refer to similar parts, there is shown in FIG. 1 a base station, generally designated 10 which includes a central office terminal (COT), generally designated 12 and a remote radio terminal (RRT), generally designated 14. The COT 12 includes a remote connection processing unit (RPU) 16 coupled through an interface 18 to an exchange unit 20. The exchange is preferably in the form of a concentrator such as "Model 1218C" digital image concentrator provided with a switch, which is presently available from ITT corporation, New York, N.Y., U.S.A.

The exchange 20 is in circuit with the central office (CO) 22 over a plurality of two-wire appearance lines 24 and is also in circuit, via echo cancellers 26 and a plurality of span trunks 28, with a plurality of multiplexers (MUX's) 30 coupled to a master timing unit (MTU) 32 in the remote radio terminal 14. Each of the span trunks 28 carries a plurality of multiplexed time slots provided by its respective MUX 30. A baseband control channel (BCC) 34, which occupies one of the time slots on one of the span trunks 28, provides communication between the MUX's 30 and the channel modules 36.

Each MUX 30 is embodied in a modular card that is capable of handling up to 24 pulse code modulation (PCM) simultaneous circuits or 23 PCM simultaneous circuits plus the BCC. The MUX's act to extract the data from the trunks 28 and to distribute it to the channel modules 36 that are in circuit with the transmitter receiver network 38 via power amplifier 40.

Figure 2:
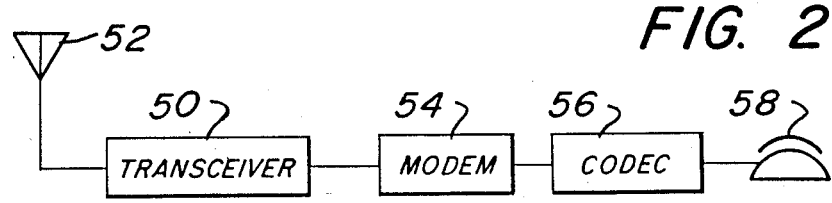
FIG. 2 is a block diagram of a single subscriber unit embodying the present invention.
Figure 3:
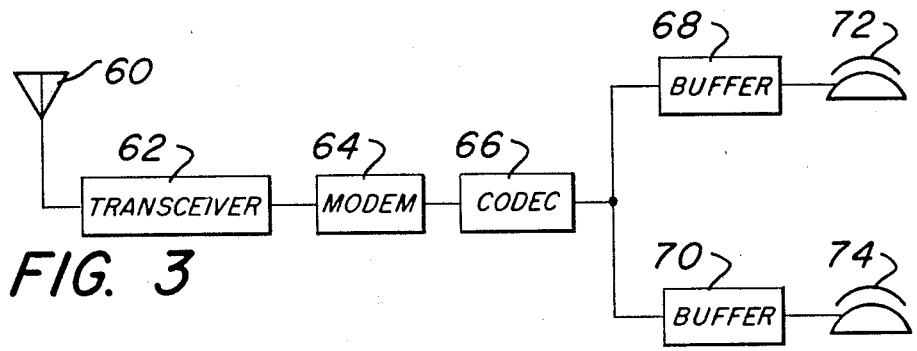
FIG. 3 is a block diagram of a dual subscriber unit embodying the present invention.

The RPU 16 has ultimate control of both the exchange (concentrator) 20 and the RRT 14 and acts to process subscribers' requests to set up the required transmission path between the subscriber stations, indicated generally at 42, and the central office (CO) 22. The subscriber stations 42 may each comprise either a single subscriber unit, a dual subscriber unit or a multiple subscriber unit. FIG. 2 shows a single subscriber unit that comprises a transceiver 50 coupled between an antenna 52 and modem 54 that is in circuit with a codec 56 for encoding or decoding signals to and from a subscriber set 58. In FIG. 3, the same general type of unit is shown except that it comprises a dual subscriber unit in which the antenna 60, transceiver 62, modem 64 and codec 66 are in circuit through buffers 68 and 70 with separate subscriber sets 72 and 74.

In the dual subscriber unit of FIG. 3, if two conversations are transmitted and received in one slot, the transceiver, modem and codec may be single reversible elements that only have to perform one set of operations at a time, e.g. transmit or receive over each line. Furthermore, since the unit is never receiving and transmitting at the same time, no duplexer is required since the only duplication that takes place is through the buffers 68 and 70 which are connected to interface circuitry (not shown) for the subscriber sets.

Figure 4:
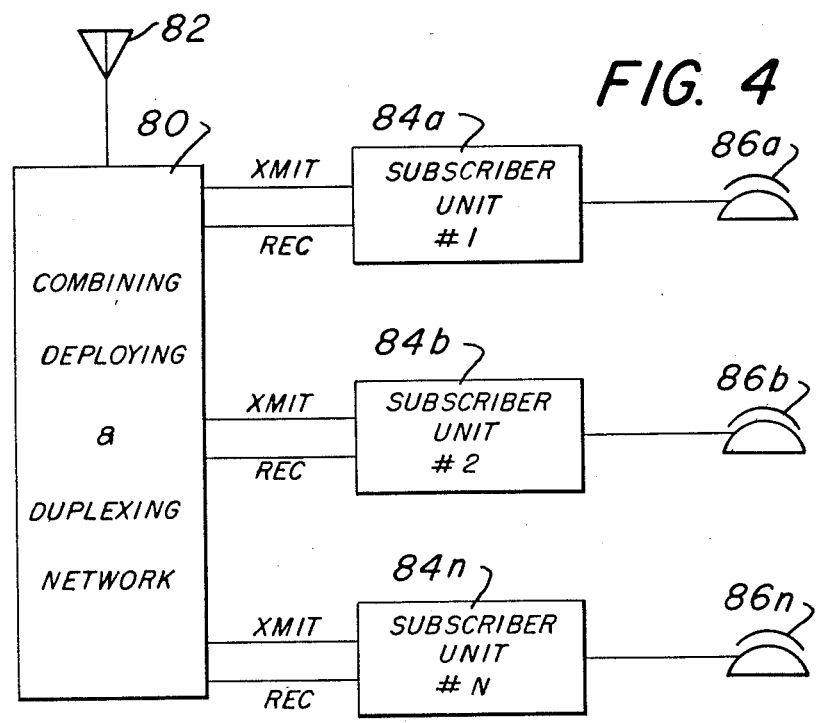
FIG. 4 is a block diagram of a multiple single-subscriber unit embodying the present invention.

In FIG. 4 there is shown a multiple system of single subscribers that comprises a combining, deploying and duplexing network, generally indicated at 80, coupled to an antenna 82 and to a multiplicity of single subscriber units 84a, 84b, 84n. Each subscriber unit is coupled to a respective subscriber set indicated at 86a, 86b and 86n.

Figures 5, 6:
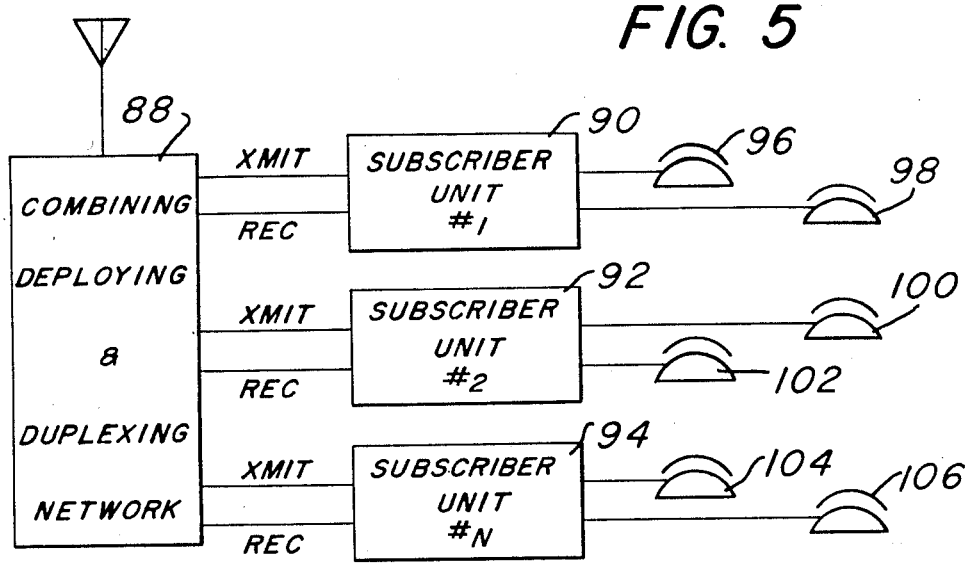
FIG. 5 is a block diagram of a multiple dual-scriber unit embodying the present invention.
FIG. 6 is illustrative of a radio processing unit matrix embodying the present invention.

FIG. 5 shows the same type of multiple system as in FIG. 4 except that the network 88 is coupled to dual subscriber units 90, 92, 94, etc., each of the type shown in FIG. 3 and each being coupled to respective dual subscriber sets, as at 96 and 98, for unit 90, at 100 and 102, for unit 92 and at 104 and 106 for unit 94.

During a conversation, some problems may arise due to various factors which may generally be classified as follows: (a) multisubscriber configuration, (b) modulation change (c) interference avoidance and (d) equipment failure of an individual channel.

FIG. 6 illustrates an example of an RPU matrix where the various subscribers are designated by the letters A through G, the horizontal rows representing frequencies and the vertical columns representing slots. The number "1" represents "in use" and "0" represents "not in use". In this matrix only the transmit slots need to be stored (as shown) since receive slots are always offset by 2 slots.

During operation, it frequently occurs that all four slots of a particular frequency are occupied by various subcribers. Assume, for example, that there is one dual subscriber unit while the others are single subscriber units. In the case of the dual subscriber unit it is necessary that the two dual subcribers thereof be in adjacent slots. If one of the two dual subscribers is occupying a particular frequency and slot while the other slots in that frequency are occupied by other single subscribers, and if the other of the two dual subscribers requires a connection because he has either gone off-hook to make a call or an incoming call is to be routed to him from the central office, either the single subscriber in the adjacent slot of that frequency must be moved to another frequency and/or slot to make room for the second of the two dual subscribers or the first dual subscriber occupying the particular frequency and slot must be moved to another frequency where an adjacent slot is available. The RPU, in this situation, acts to set up the current connections and store them in its memory and it can, therefore, determine where within the matrix a transfer can be effected.

The above type of transfer is accomplished in the following manner: Assume, for example, that the first of the dual subscribers is currently engaged in a conversation on frequency D in transmit slot 1 (receive slot 3). When the second of the dual subscribers goes off-hook, an alert signal (one bit) is sent back to the base station as part of the control bits transmitted in addition to the conversation. The alert bit is detected in the channel module 36 which then sends a message back to the RPU 16 via the MUX 30, span trunk 28, exchange 20 and interface 18, either along with the reverse conversation path or along a separate path. Conversely, an incoming signal from the control office (CO) 22 is routed through the exchange 20 and interface 18 to the RPU 16.

In the event of the occurence of either signal, e.g. from the off-hook set or from the central office, a slot must be made available for the second of the dual subscribers to connect to the base station in a slot adjacent to the slot already in use by the first of the dual subscribers. While it would be possible to move the first dual subscriber from frequency channel D to G, that would be the less preferable move since two empty adjacent slots on the same frequency are not often available. It is, in any event, at least as easy to move the adjacent single subscriber unit from frequency D, slot 2 to a different frequency. In the example shown, the adjacent subscriber could be moved to any one of the eight open slots. Since the single subscriber being moved does not require adjacent slots for transmission and reception, if the move is made in frequency only (e.g. from channel D to B or G) it can be accomplished while the slot is unused and is, therefore, glitchless. If a change is made in both slot and frequency, then one slot's worth of transmission data is either duplicated or lost.

The analagous situation exists with multiple single unit subscribers, such as in FIG. 4. Since each unit has a complete set of elements, more than one unit is capable of transmitting at one time. It is, in fact, preferable to have all transmit simultaneously and receive simultaneously in order to prevent receiver front-end overload. Therefore, in the matrix of FIG. 6, if two subscribers are occupying slot 1 on frequencies B and D and a call set-up is required for a third subscriber, then the RPU 16 must assign the third subscriber to slot 1 on either frequency F or G.

Where the system is that of FIG. 5, where there are multiple dual subscriber units, the first subscribers of each pair of dual subscribers must be in the same slot but on different frequencies while the second of each pair must be in adjacent slots on the same frequencies as their respective first subscribers.

The RPU, in the above situations, acts to set up the current connections at each interval of time and stores them in its memory. It can, therefore determine, at any time, where within the matrix a transfer can be effected.

In all of the above situations where the concern is with the assignment of slots and frequencies in multi-subscriber situations, the stimulus for change originates outside the base station (either from the central office or the subscriber set). In the following situations which involve modulation change due to fading, or interference avoidance or change due to equipment failure, the stimulus originates or is detected in the base station itself.

Figure 7:
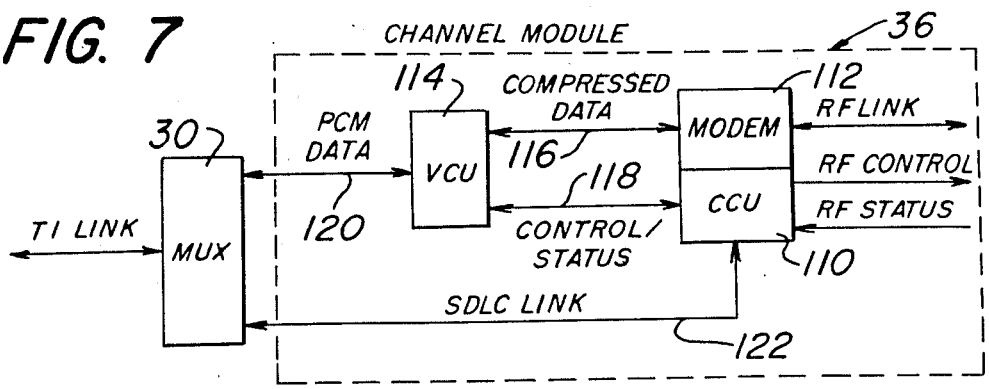
FIG. 7 is a block diagram showing the details of a channel module utilized in the present invention.

In the base staton, each channel module 36, as shown in FIG. 7, includes a channel control unit (CCU) 110 and a modem 112, each being coupled to a voice codec unit (VCU) 114 by respective compressed data link 116 and control status link 118. The VCU is interfaced to the MUX 30 by pulse code modulation (PCM) data channels 120, while the CCU is interfaced with to the MUX 30 by synchronous data link control (SDLC) 122.

A number of buffers (not shown) are associated with the various elements. In this respect, each channel module contains an AGC buffer for each slot as well as a link quality (LQ) buffer that measures the differential of received phase error. In addition, the VCU is provided with a bit error rate (BER) buffer. A cyclic redundancy check (CRC) is transmitted as part of each conversation encoded burst which provides a BER count to the BER buffer.

For the present purposes, a high AGC level means that a high signal level is being received and the receiver gain is small. Conversely, a low AGC level indicates a low received signal level and a large receiver gain. This AGC level is used to indicate whether a deterioration of signals is due to fading of the signal or whether there is interference. Interference is indicated by a higher AGC level because the AGC level is based on the sum of the transmitted signals plus any interfering signals. In either instance correction can be made by modulation change. In this respect, as more fully described hereinafter, each channel module 36 contains a modem that is capable of transmitting and receiving on voice slots with either 16 or 4 phase modulation. There are only half as many bits passed per symbol in 4 phase modulation as there are in 16 phase modulation, but the bit rate is the same. Therefore, when 4 phase modulation is used, two adjacent slots, as shown in the matrix of FIG. 6, are combined into one elongated slot containing the same number of bits per elongated slot as would occur in a slot during 16 phase operation.

When, for example, a dual subscriber system is in operation, if either the BER increases beyond a certain threshold (e.g. 0.1%) or the LQ decreases below a certain threshold (e.g. 6 degrees) the contents of the corresponding buffers are reported to the RPU via the MUX-spanexchange(concentrator)-interface link. The RPU thereupon sends a control signal back via the same linkage to the control module to change from 16 to 4 phase operation. At the same time, if two subscribers are currently in operation in adjacent slots on the same frequency, one of the subscribers is changed to another frequency in the manner described above.

If after the modulation level has been changed in the above manner, the AGC level is still high for that particular subscriber, it is assumed that the reason for the poor BER and LQ is interference rather than transmission fade. The outputs of all the AGC buffers are reported to the RPU which determines which frequencies (if any) have a low AGC level and the RPU then initiates a change in frequency for that subscriber from the frequency with a high AGC level to one having a low AGC level. This acts to eliminate the interference if it is present.

The base station is also provided with malfunction (MF) buffers which provide the operational status of each link in the base station chain including the exchange (concentrator), span trunk, MUX, channel module, power amplifier, transmitter and receiver. If the MF buffer senses a malfunction or equipment failure, a signal is sent to the RPU indicating which frequency is involved. On receipt of this MF signal, the RPU initiates a frequency (and, if necessary, a slot) change for each conversation (if any) currently taking place on the affected channel.

Figure 8:
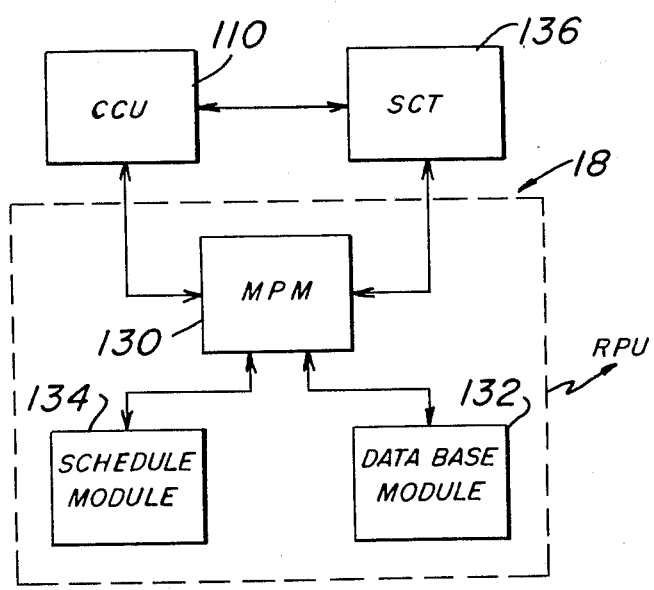
FIG. 8 is a block diagram of a radio processing unit and its connecting elements embodying the present invention.

The RPU 18 is a primary element in controlling the assignment of frequency channels and slots and its general structure is shown in FIG. 8. It comprises a message processing module (MPM) 130 coupled to a data base module (DBM) 132 and a scheduler module (SM) 134. The MPM manages all interface between the SM and DBM within the RPU as well as with the channel control unit (CCU) 110 and a subscriber control task (SCT) 136 situated outside the RPU. The CCU is located within the channel module 36, as shown in FIG. 7, while the SCT is in circuit with the subscriber stations.

In operation, if, for example, during a call, the link quality (LQ) goes down below a predetermined level, the RPU is actuated to send a message to the SCT 136, which, thereupon, communicates with the MFM 130. The MFM then (a) sends a signal to the DBM 132 to identify an available channel, and (b) checks with the scheduler module 134 for schedule control and timing (the scheduler module serving to arrange the messages received by it in the order that they are received). If there is an available channel, the MPM sends a message back to the SCT to reconfigure the matrix to move the call to the available channel. If there is no available channel, the call is retained in the same channel.

If during a call, all four slots are occupied but, because of an interference on a particular frequency, it is necessary to move all the subscribers to another frequency with the same respective slots, the following sequence occurs: The RPU, upon being actuated by the lowering of the link quality, sends a message to the SCT requesting a frequency change. The SCT forwards that message to the channel control task (CCT), located at the subscriber station, for frequency change processing, and also communicates with the MPM at the base station for allocation of an available CCU channel. The MPM sends a signal to the DBM to identify an available channel and also checks with the scheduler module to obtain a time position in the schedule. If there is an available channel, the MPM sends a message back to the SCT to reconfigure the channel position. If there is no available channel, the SCT sends a busy siqnal to the RPU and no change is made.

Figure 9:
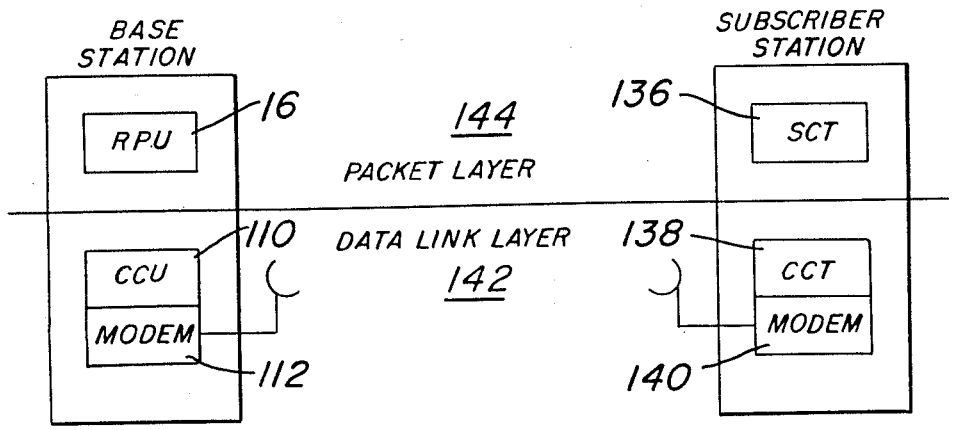
FIG. 9 is a functional illustration showing the layers of communication between the base station and a subscriber station.

FIG. 9 illustrates the RCC protocol. The RPU 16 is in communication with the CCU 110 and modem 112. At the subscriber station the SCT 136 is in communication with the CCT 138 which is provided with modem 140. The RCC protocol consists of two layers, a data link layer 142 and a packet layer 144. The data link layer is the physical link between the parts while the packet layer comprises the messages being passed over this physical link. The data link layer is responsible for error detection, word synchronization and framing, detection and resolution of collisions (conflicting contention for the same time slot on the same RF channel).

Referring to FIG. 9, an an example, the RPU processes two paths of protocol: In the first protocol, the RPU sends a message to the CCU at the base station to request a modulation change. In the second protocol, the RPU sends a message to the SCT to request a frequency change. In the third protocol, the SCT sends a message back to the RPU to indicate that all channel frequencies are occupied.

In another example, the RPU sends a message protocol to the SCT to request a channel frequency change. This message initiates two functions: First, the message requests that the SCT at the subscriber station obtain a route to another frequency from the RCC. The SCT thereupon communicates with the CCT. The CCT then searches the channels and, when it finds an available slot and frequency, it switches thereto. In the second function, the message protocol causes the SCT to call the centraL office to stand by for a connection.

If, during a conversation, the link quality falls below a predetermined level, the RPU forwards this information to the CCU and requests a modulation level change. The CCU acknowledges this message through the SCLC link via the MUX to the RPU.

The invention claimed is:

1. In a communication system provided with a base station that is in communication with a central office and subscriber stations that are connected to said base station by RF channels, said base station having multiple sequentially repetitive time slots and a plurality of frequency channels, said time slots and frequency channels being selectively assignable to said subscriber stations by movement of said subscriber stations to selected vacant time slots or frequency channels in accordance with a predetermined assignment schedule, said system including assignment means for selectively assigning time slots and frequency channels to any of the subscriber stations in response to either the coming on line of an additional subscriber or to a deterioration in transmission between the base station and a subscriber station in communication therewith.

2. The system of claim 1 wherein said assignment means makes its assignments in response to a deterioration in transmission due to either a modulation change, a frequency channel interference or an equipment failure.

3. The system of claim 1 wherein there are a multiplicity of single subscriber stations in communication with said assignment means.

4. The system of claim 1 wherein there are a multiplicity of dual subscriber stations in communication with said assignment means, each subscriber of each pair of dual subscribers being separately assignable to adjacent slots in a selected frequency channel by said assignment means.

5. In a communication system having a base station in communication with a central office and with a plurality of subscriber stations through RF channels, said base station having multiple sequentially repetitive time slots and a plurality of frequency channels, the method of assigning time slots and frequency channels to selected subscribers by assigning said subscribers to selected vacant slots in selected frequency channels in accordance with their adjacency to occupied slots in a memory matrix, said assignment being in response to stimuli occasioned by either additional subscribers going on line or by deterioration of transmissions between the base station and the subscribers.

6. The method of claim 5 wherein the deterioration of transmissions is caused by either modulation change, frequency channel interference or equipment failure.

7. The method of claim 5 wherein said assignments take place during conversations between subscribers.

8. A communication system including a base station and a plurality of subscriber stations in communication with each other and with an external communication network having a plurality of ports, comprising a communication circuit including
a matrix containing a pattern of frequency channels, each frequency channel having a multiplicity of time slots, the time slots being arranged relative to each other in a pattern transverse to the pattern of frequency channels whereby a subscriber station may be selectively movable from one slot to another within a selected frequency channel or from one slot in one frequency channel to another slot in another frequency channel, said matrix enabling simultaneous communications between a plurality of the ports and a plurality of the subscriber stations;

an exchange for connecting the communication circuit to the external communication network ports; and a remote-connection processor coupled both to the communication circuit by a base-station control channel and to the exchange, for continually monitoring the status of the time slots and for causing the communication circuit and the exchange to complete connections between selected external commication network ports and selected subscriber stations over time slots assigned in response to the monitored status of each of said time slots;

said remote connection processor having a memory for storing said connections at each interval of time, whereby it is capable, at any time, of determining where within the matrix a transfer of time slots can be effected.

* * * * *

US004785450B1

REEXAMINATION CERTIFICATE (3898th)

United States Patent [19]
Bolgiano et al.

[11] B1 4,785,450
[45] Certificate Issued Oct. 12, 1999

[54] APPARATUS AND METHOD FOR OBTAINING FREQUENCY AGILITY IN DIGITAL COMMUNICATION SYSTEM

[75] Inventors: Duane R. Bolgiano, Gladwyne; Chumlong Deangdeelert, Philadelphia, both of Pa.

[73] Assignee: Interdigital Technology Corporation, Wilmington, Del.

Reexamination Request:
No. 90/004,867, Dec. 12, 1997

Reexamination Certificate for:
Patent No.: 4,785,450
Issued: Nov. 15, 1988
Appl. No.: 07/082,238
Filed: Aug. 6, 1987

[51] Int. Cl.[6] .................................. H04J 3/16; H04J 4/00
[52] U.S. Cl. ........................... 370/329; 455/403; 455/452; 370/330; 370/468
[58] Field of Search .................................... 370/310, 319, 370/321, 322, 323, 325, 329, 330, 341, 431, 436, 478, 437, 468, 465, 433; 455/450, 451, 452, 453, 454, 509, 512, 514, 403

[56] References Cited

U.S. PATENT DOCUMENTS

| | | | |
|---|---|---|---|
| 3,370,128 | 2/1968 | Morita et al. | 370/478 |
| 3,499,995 | 3/1970 | Clark | 370/478 |
| 3,571,756 | 3/1971 | Farsta et al. | 332/9 |
| 3,601,545 | 8/1971 | Saburi | 179/15 BA |
| 3,764,915 | 10/1973 | Cox et al. | 325/53 |

(List continued on next page.)

FOREIGN PATENT DOCUMENTS

| | | | |
|---|---|---|---|
| 0226610 | 3/1990 | European Pat. Off. | H04Q 7/04 |
| 2659635 | 7/1978 | Germany | H04B 7/26 |
| 3447107 | 6/1986 | Germany | H04J 9/00 |
| 55-120235 | 9/1980 | Japan | H04B 7/26 |
| 59-158138 | 9/1984 | Japan . | |
| 1562964 | 3/1980 | United Kingdom | H04Q 7/04 |
| 2174571 | 11/1986 | United Kingdom | H04Q 7/04 |

OTHER PUBLICATIONS

Proceedings of the Int. Conference on Communications—ICC '84, Amsterdam, The Netherlands, May 14–17, 1984, pp. 1192–1198, H. P. Fannschmidt et al., "MATS–E A Cellular Mobile Automatic Telephone System".

GSM Recommendation: 05.08, *Radio Sub–System Link Control*, Jan. 7, 1987, Cover Page and Sections 1–3.6.

Bellamy, John, *Digital Telephony*, pp. vii–ix, 68–73, 238–241 (1982).

DeWilde, P. *Links For The Future, Science, Systems & Services for Communications*, Proceedings of the International Conference on Communications–ICC'84, Amsterdam, The Netherlands, May 14–17, 1984, pp. 1192–1198.

GSM Recommendation: 05.08, *Radio Sub–System Link Control*, Jan. 7, 1987, Sections 2.2–3.6.

Hirade, Kenkichi, *Feasibility of Digital Voice Transmission In Mobile Radio Communication*, (Translation), pp. 1–14 (original attached) (1978).

ICASSP 82 Proceedings, IEEE International Conference on Acoustics, Speech and Signal Processing, vol. 3 of 3, May 3, 4, 5, 1982, Paris, France, pp. 1671–1675.

International Conference on Communications, *Conference Record*, vol. 2 of 4, Denver, Colorado, Jun. 14–18, 1981, pp. 23.4.1–23.4.5.

(List continued on next page.)

*Primary Examiner*—Huy D. Vu

[57] ABSTRACT

In a communication system that comprises a plurality of subscriber stations in RF communication with a base station having multiple sequentially repetitive time slots, each time slot being assigned to a particular subscriber station, means to change either the frequency or the time slot configurations, or both, in the event of a deterioration of transmission quality caused by modulation change, frequency channel interference, equipment failure, or the like, or by the entrance of additional subscriber stations going on line.

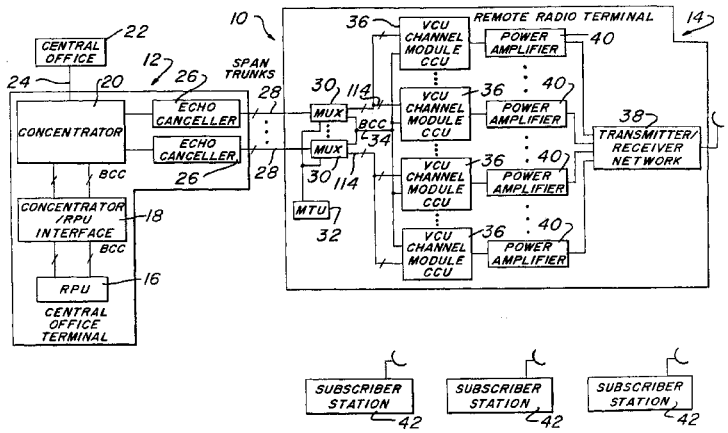

U.S. PATENT DOCUMENTS

| | | | |
|---|---|---|---|
| 3,848,093 | 11/1974 | Edstrom | 179/15 |
| 3,973,200 | 8/1976 | Akerberg | 325/55 |
| 4,009,344 | 2/1977 | Flemming | 179/15 |
| 4,058,673 | 11/1977 | Johansson | 178/22 |
| 4,068,099 | 1/1978 | Mikkola et al. | 179/15 |
| 4,112,257 | 9/1978 | Frost | 179/2 EB |
| 4,113,987 | 9/1978 | Samuelsson | 179/15 |
| 4,215,244 | 7/1980 | Gutleber | 370/468 |
| 4,309,764 | 1/1982 | Acampora | 370/83 |
| 4,355,411 | 10/1982 | Reudink et al. | 455/437 |
| 4,357,700 | 11/1982 | Alvarez, III et al. | 370/83 |
| 4,398,063 | 8/1983 | Hass et al. | 455/436 |
| 4,622,665 | 11/1986 | Jonsson et al. | 370/100 |
| 4,628,152 | 12/1986 | Akerberg | 379/51 |
| 4,638,479 | 1/1987 | Alexis | 370/95 |
| 4,654,841 | 3/1987 | Ekberg | 370/16 |
| 4,654,867 | 3/1987 | Labedz et al. | 379/59 |
| 4,675,863 | 6/1987 | Paneth et al. | 370/150 |
| 4,682,350 | 7/1987 | Akerberg | 379/61 |
| 4,697,260 | 9/1987 | Grauel et al. | 370/18 |
| 4,709,401 | 11/1987 | Akerberg | 455/51 |
| 4,716,573 | 12/1987 | Bergstrom et al. | 375/1 |
| 4,718,062 | 1/1988 | Andersen | 370/94 |
| 4,730,305 | 3/1988 | Acampora et al. | 370/60 |
| 4,731,812 | 3/1988 | Akerberg | 379/61 |
| 4,737,978 | 4/1988 | Burke et al. | 379/60 |
| 4,742,514 | 5/1988 | Goode et al. | 370/109 |
| 4,754,450 | 6/1988 | Lynk, Jr. et al. | 370/478 |
| 4,754,453 | 6/1988 | Eizenhöfer | 370/95 |
| 4,759,022 | 7/1988 | Akerberg | 371/69 |
| 4,763,322 | 8/1988 | Eizenhöfer | 370/95 |
| 4,764,928 | 8/1988 | Akerberg | 371/69 |
| 4,797,947 | 1/1989 | Labedz | 455/33 |
| 4,802,219 | 1/1989 | Tjerlund | 380/39 |
| 4,817,089 | 3/1989 | Paneth et al. | 370/95 |
| 4,837,786 | 6/1989 | Gurantz et al. | 370/20 |
| 4,868,890 | 9/1989 | Lennartsson | 455/139 |

OTHER PUBLICATIONS

Izumi, Kazuo, *Basic Study of Time Division Multiple Access Mobile Communication System,* (Translation), General Meeting, 1978, pp. 1–6.

Izumi, Kazuo, *A Digital Mobile Radio Telephone System Using TDMA Scheme,* (Translation), (1979) pp. 1–13.

Kinoshita, *A Digital Mobile Telephone System Using TD–FDMA Scheme,* Apr. 16, 1981, pp. 1–18.

Kinoshita, *Evaluation of 16 Kbit/s Digital Voice Transmission for Mobile Radio,* Nov. 1984, IEEE Transactions on Vehicular Technology, vol. VT–33, No. 4, pp. 321–327.

Kinoshita, *Study of Modulation/Demodulation Scheme in TDMA Mobile Communication,* (Translation), General Meeting, Japanese Society of Electronic Communication, 1979, pp. 1–4.

Kinoshita, *TDMA Mobile Wireless Telephone Experimental Device,* (Translation), General Meeting, Japanese Society of Electronic Communication, 1980, pp. 1–3.

Kinoshita, *Digital Mobile Radio Telephone System Using TD/FDMA Scheme,* 1981, Yokosuka Electrical Communication Laboratory, pp. 23.4.1–23.4.5.

Kinoshita, *Digital Mobile Telephone System Using TD/FDMA Scheme,* Nov. 1982, IEEE Transactions on Vehicular Technology, vol. VT–31, No. 4, pp. 153–157.

Kinoshita, *A Digital Mobile Telephone System Using TD–FDMA Scheme,* (Translation), Apr. 1981, Denshi Tsushin Gakkai Ronbun Shi, vol. J64–B, No. 9, pp. 1–18.

Kontani, *NEAX 61 Digital Mobile Telephone Switching System,* Oct. 1982, pp. 21–31.

Landon, S.N., Project Report, *TACS System Operator's Console,* Jun. 28, 1979, pp. iii–68.

Lueg, AGARD Conference Proceedings No. 239, *Digital Communications In Avionics,* Jun. 5–9, 1978, Munich, Germany.

Second Nordic Seminar on Digital Land Mobile Radio Communication, Oct. 14–16, 1986, Proceedings.

Storch, et al. Technical Report, *TACS Central Control Facility,* Feb. 12, 1981, pp. iii–175.

Taylor, Project Report, *Terminal Access Control System (TACS) Circuit Allocation,* May 8, 1978, pp. iii–41.

Taylor, *TACS–A Demand Assignment System for Fleetsat,* 1979, pp. 1484–1496.

Bridwell, J.D., *A Terminal Access Control System For Fleetsat,* Nov. 22, 1976, pp. iii–69.

Bridwell, J.D., *A Preliminary Design of a TDMA System for Fleetsat,* Mar. 12, 1975, pp. iii–5, 7–71 and 73–87.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *